United States Patent Office 3,787,447
Patented Jan. 22, 1974

3,787,447
PROCESS FOR THE PREPARATION OF
3-ACETOXY PHTHALIDE
Pierre Raoul, Epinay-sur-Orge, France, assignor to Produits Chimiques Pechiney-Saint-Gobain, Neuilly-sur-Seine, France
No Drawing. Filed May 25, 1970, Ser. No. 41,159
Claims priority, application France, June 3, 1969, 6918215
Int. Cl. C07d 5/32
U.S. Cl. 260—343.3           9 Claims

ABSTRACT OF THE DISCLOSURE

This invention is addressed to a new and improved process for the preparation of 3-acetoxy phthalide from orthoxylene in which orthoxylene in acetic acid or a mixture of acetic acid and acetic anhydride is oxidized to form the 3-acetoxy phthalide and phthalic anhydride.

---

This invention relates to a new and improved process for the preparation of 3-acetoxy phthalide from orthoxylene.

From the orthoxylene it is known to prepare 3-acetoxy phthalide of the formula:

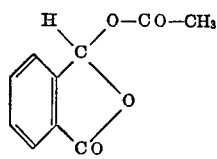

by a series of successive stages which include photochlorinating orthoxylene, hydrolyzing the orthopentachloro-α,α,α,α′,α′-xylene obtained by photochlorination in an acid medium in the presence of ferric chloride, then allowing the thus obtained formyl-2 benzoic acid to react with acetic anhydride at its boiling temperature. This process has the disadvantage of being particularly expensive and extensive and yields insufficient yields. Specifically, the process requires the use of ultraviolet lamps, a large amount of ferric chloride, entails a great loss of chlorine atoms and produces 3-acetoxy phthalide in a maximal total molecular yield of only 46%.

It has now been found that it is possible to convert orthoxylene into 3-acetoxy phthalide in a single stage with a molecular yield up to 60%. Furthermore, the formation of 3-acetoxy phthalide is accompanied by the production of phthalic anhydride in a molecular yield of about 40% which is widely used in the manufacture of plasticizers and polyesters.

In accordance with the practice of the present invention 3-acetoxy phthalide is prepared by preparing an orthoxylene solution in acetic anhydride or a mixture of acetic acid and acetic anhydride, oxidizing the resulting solution in the liquid phase in the presence of a catalyst system at a temperature within the range of 80° to 200° C. and a pressure within the range of 1 to 30 bars and separating the 3-acetoxy phthalide from the reaction medium.

According to this invention, the oxidation of the orthoxylene solution is achieved by introduction of an oxygen containing gas such as pure oxygen, air or an air-oxygen mixture, into the reaction medium at a flow which is a function of the reaction progress.

The catalytic systems beneficially used in order to effect the oxidation process are composed of salts of transition metals coupled with a promoter.

As the transition metal salts which can be used in the practice of the present invention, there are the salts of cobalt, manganese, cerium, nickel, vanadium or mixtures thereof. Acetates of the foregoing metals are frequently preferred, and particularly cobalt acetate.

As the promoter, use can be made of ozane; aliphatic aldehydes having 1–6 carbon atoms such as acetaldehyde, propionaldehyde, etc.; or, aliphatic alpha-methylenic ketones containing 3–10 carbon atoms such as methyl ethyl ketone, methyl isopropyl ketone, etc. Preferred promoters, however, are promoters which contain a halogen, particularly bromine, in the form of an inorganic bromide or a bromine atom in an organic compound. Representative of these preferred pomotes include sodium bromide, ammonium bromide, barium bromide, cobalt bromide, bromoform, acetyl bromide, tetrabromoethane, bromoacetic acid, etc.

For best results in accordance with the process of this invention, there are beneficially used:

(a) an orthoxylene solution in an acetic anhydride or in an acetic anhydride-acetic acid mixture in which the concentration of orthoxylene is 1 part by weight or orthoxylene for 2–20 parts by weight of solvent;

(b) salts of transition metals according to a molar ratio bromine/orthoxylene which may vary between 10 and 10:5;

(c) bromine compounds according to a mole ratio bromine/orthoxylene which may vary from 10 to 10⁻⁵, the atomic ratio transition metal/bromine varying from 0.01 to 10.

According to the process of this invention, at the end of the oxidation operation, the reaction medium is principally composed of 3-acetoxy phthalide, phalic anhydride and solvent of the orthoxylene. The separation process of the 3-acetoxy phthalide from the reaction medium can be achieved by direct distillation. To facilitate fractionation and to avoid the coking, it is preferable to achieve the separation process by selective extraction with a solvent in the presence of warm water after elimination of the anhydride or anhydride-acid solvent from the orthoxylene by distillation.

3-acetoxy phthalide prepared according to the process of this invention, is easily converted into formyl-2 benzoic acid by hydrolysis in an acid medium. The derivatives of this acid are particularly used as tuberculostatics, as insecticides and microbicides, as plasticizers of the polyvinyl chloride, as antioxidants for rubber and also in the field of color-photography.

Having described the basic concepts of the invention, reference is now made to the following examples which are provided by way of illustration, and not by way of limitation, of the practice of the invention.

EXAMPLE 1

In a glass reactor of 1.5 litres capacity, equipped with a stirrer, a thermometer, an oxygen inlet, a reflux condenser, and a device enabling it to operate under a constant pressure, there are dissolved 159 g. of orthoxylene, 11.7 g. of tetrahydrated cobalt acetate and 3.9 g. of dihydrated barium bromide in 800 g. of acetic anhydride. The solution obtained is heated at 120° C. and then there is passed for 2 hours an oxygen current at a flow such that the whole oxygen is absorbed by the reaction medium. On account of the reaction progress this flow varies between 50 and 2 litres/hour.

The reaction is achieved under an absolute pressure of 1067 mm. Hg. During the three first quarters of an hour there occurs a strong exothermicity requiring a cooling of the reactor by a compressed air stream.

At the end of reaction, the acetic anhydride is distilled under a pressure of 15 mm. Hg; then there are added 800 g. of water to the undistilled residue and the thus obtained mixture is maintained at its boiling temperature for 30 minutes under agitation in order to convert the phthalic anhydride into orthophthalic acid. The mixture is then cooled at about 40–50° C. and then the 3-acetoxy phthalide is extracted in 3 fractions of 350 cm.$^3$ of chloroform. In the aqueous phase there remains the orthophthalic acid fully insoluble in the chloroform, which is filtrated off.

The 3-acetoxy phthalide is separated from the chloroform by vacuum distillation; it appears in the form of slightly yellow crystals melting at about 60–65° C. Its boiling point is 133–138° C. under a pressure of 0.1 mm. Hg.

There is recovered 167 g. of 3-acetoxy phthalide, corresponding to a molecular yield of 58%, and 100 g. of orthophthalic acid, corresponding to a molecular yield of 40%.

EXAMPLE 2

In the apparatus described in Example 1, there are dissolved 106 g. of orthoxylene in a mixture of 200 g. of glacial acetic acid and of 350 g. of acetic anhydride. Afterwards, there are added 2.6 g. of dihydrated barium bromide and 7.8 g. of tetrahydrated cobalt acetate. The solution obtained is heated at 118° C. At an absolute pressure of 1067 mm. Hg, there is introduced an oxygen stream at a flow varying between 50 and 2 litres/hour according to the reaction progress as in the process described in the preceding example. It is necessary to cool the reactor at the start of the oxidation.

After 3 hours of reaction, the process is stopped and the reaction zone is cooled by a water-ice mixture. The resulting precipitate is filtrated and there is obtained 95 g. of a precipitate appearing in the form of white crystals melting at 95–96° C.

The nuclear magnetic resonance spectrum of this precipitate shows that it contains a mixture composed of about 60–50% by weight of phthalic anhydride and of about 40–50% by weight of 3-acetoxy phthalide.

The table below in which are indicated the melting zones of various 3-acetoxy phthalide/phthalic anhydride mixtures of known compositions, shows that the phthalide forms a molecular combination with the phthalic anhydride to the extent of 50/50.

| Phthalic anhydride | | 3-Acetoxy phthalide | | |
|---|---|---|---|---|
| Percent by weight | Molar, percent | Percent by weight | Molar, percent | Melting, ° C. |
| 100 | 100 | 0 | 0 | 131 |
| 0 | 0 | 100 | 100 | 71 |
| 10 | 13 | 90 | 87 | 62–80 |
| 20 | 24 | 80 | 76 | 66–89 |
| 30 | 36 | 70 | 64 | 76–95 |
| 40 | 46 | 60 | 54 | 92–97 |
| 43 | 50 | 57 | 50 | 95–97 |
| 50 | 57 | 50 | 43 | 95–97 |
| 57 | 63 | 43 | 37 | 96–99 |
| 60 | 66 | 40 | 34 | 94–97 |
| 80 | 84 | 20 | 16 | 96–125 |
| 90 | 92 | 10 | 8 | 96–128 |

From the 95 g. of the above obtained crystals, by the method described in Example 1, 43 g. of orthophthalic acid and 49 g. of 3-acetoxy phthalide are separated. The filtrate resulting from the filtration of the 95 g. of crystals is afterwards evaporated to ⅔, then taken again by 100 cm.$^3$ of water. A new extraction with chloroform allows to isolate to 35 g. of orthophthalic acid and 51 g. of 3-acetoxy phthalide.

The total balance of the reaction product is 78 g. of orthophthalic acid, corresponding to 47% in yield and 100 g. of 3-acetoxy phthalide, corresponding to 52% in yield.

EXAMPLE 3

It has been found that when, during the distillation process of the acetic anhydride or of the acetic anhydride/acetic acid mixture, the 3-acetoxy phthalide is heated for a too long time, there is formed a yellow impurity in the state of a non-identified trace. This impurity can be eliminated by addition of 200 cm.$^3$ of acetone to 100 g. of 3-acetoxy phthalide. There is also added 10 g. of activated carbon and the mixture is raised to boiling for half an hour, and then filtered while hot. 100 cm.$^3$ of acetone are eliminated by distillation and the 3-acetoxy phthalide is precipitated by the addition of 100 cm.$^3$ of petroleum ether. The 3-acetoxy phthalide thus obtained is particularly pure and appears in the form of white crystals melting at 70–71° C.

EXAMPLE 4

This example relates to the use of the 3-acetoxy phthalide in the preparation of the formyl-2 benzoic acid.

There is heated for 4 hours at its its boiling temperature a solution of 45 g. of 3-acetoxy phthalide in a mixture composed of 500 cm.$^3$ of acetic acid of 50 cm.$^3$ of water and of 2 cm.$^3$ of concentrated hydrochloric acid. Afterwards the solution is concentrated under vacuum. Thus, one isolates 38 g. of a solid which after crystallization in 150 cm.$^3$ of water gives 30 g. of formyl-2 benzoic acid, thus corresponding to 85% in yield. The product appears in the form of white crystals melting at about 97–98° C.

It will be understood that various changes and modifications may be made in the details of formulation, procedure and use without departing from the spirit of the invention, especially as defined in the following claims.

I claim:

1. A process for the preparation of 3-acetoxy phthalide from orthoxylene which comprises preparing an orthoxylene solution in an acetic anhydride or an acetic acid-acetic anhydride mixture, oxidizing the solution obtained in the liquid phase with a molecular oxygen containing gas in the presence of a catalytic system comprising an acetate salt of a transition metal selected from the group consisting of cobalt, manganese, cerium, nickel and vanadium and a promoter selected from the group consisting of ozone, acetaldehyde, propionaldehyde, methyl ethyl ketone, methyl isopropyl ketone and a bromine containing compound selected from the group consisting of sodium bromide, ammonium bromide, barium bromide, cobalt bromide, bromoform, acetyl bromide, tetrabromoethane and bromoacetic acid at a temperature comprised between 80° C. and 200° C. under a pressure from 1–30 bars, and separating the thus formed 3-acetoxy phthalide from the reaction medium.

2. A process as defined in claim 1 wherein the oxidation of the orthoxylene solution is achieved by introduction of pure oxygen, air or an air-oxygen mixture into the reaction medium, at a flow which is a function of the reaction progress.

3. A process as defined in claim 1 wherein the transition metal salt is cobalt acetate.

4. A process as defined in claim 1 wherein the promoter is selected from the group consisting of sodium bromide, ammonium bromide, barium bromide, cobalt bromide, bromoform, acetyl bromide, tetrabromoethane and bromacetic acid.

5. A process as defined in claim 1 wherein the orthoxylene solution in the acetic anhydride or the acetic anhydrideacetic acid mixture has a concentration of 1 part by weight of orthoxylene for 2–20 parts by weight of solvent.

6. A process as defined in claim 1 wherein the acetate salt of the transition metal is present in a transition metal/orthoxylene molar ratio between 10 and 10:5.

7. A process as defined in claim 1 wherein the bromine compound is present in a bromine/orthoxylene molar ratio from 10 to 10:5 and the transition metal/bromine atomic ratio is from 0.01 to 10.

8. A process as defined in claim 1 wherein the catalytic system is composed of the acetate of said transition metal and a bromine containing compound.

9. A process as defined in claim 1 wherein the catalytic system is formed of the acetate of said transition metal combined with a promoter selected from the group consisting of ozone, acetaldehyde, propionaldehyde, methyl ethyl ketone and methyl isopropyl ketone.

References Cited
UNITED STATES PATENTS
2,897,210   7/1959   Wheeler et al. _____ 260—343.3

ALEX MAZEL, Primary Examiner
A. M. T. TIGHE, Assistant Examiner

UNITED STATES PATENT OFFICE
CERTIFICATE OF CORRECTION

Patent No. 3,787,447  Dated Jan. 22, 1974

Inventor(s) Pierre Raoul

It is certified that error appears in the above-identified patent and that said Letters Patent are hereby corrected as shown below:

Column 2, line 37, correct the spelling of "phthalic"

Column 3, line 51, before "phthalide" insert -- 3-acetoxy --

Signed and sealed this 9th day of July 1974.

(SEAL)
Attest:

McCOY M. GIBSON, JR.
Attesting Officer

C. MARSHALL DANN
Commissioner of Patents